(12) United States Patent
Rosenbluth et al.

(10) Patent No.: US 7,246,197 B2
(45) Date of Patent: Jul. 17, 2007

(54) SOFTWARE CONTROLLED CONTENT ADDRESSABLE MEMORY IN A GENERAL PURPOSE EXECUTION DATAPATH

(75) Inventors: Mark B. Rosenbluth, Uxbridge, MA (US); Gilbert Wolrich, Framingham, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 11/043,782

(22) Filed: Jan. 25, 2005

(65) Prior Publication Data

US 2005/0132132 A1    Jun. 16, 2005

(51) Int. Cl.
*G06F 12/00* (2006.01)
(52) U.S. Cl. ........................................ 711/108; 365/49
(58) Field of Classification Search ................ 711/108; 365/49
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,881,173 A | 4/1975 | Larsen et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,045,782 A | 8/1977 | Anderson et al. | |
| 4,130,890 A | 12/1978 | Adam | |
| 4,189,767 A | 2/1980 | Ahuja | |
| 4,392,758 A | 7/1983 | Bowles et al. | |
| 4,400,770 A | 8/1983 | Chan et al. | |
| 4,514,807 A | 4/1985 | Nogi | |
| 4,523,272 A | 6/1985 | Fukunaga et al. | |
| 4,569,016 A | 2/1986 | Hao et al. | |
| 4,724,521 A | 2/1988 | Carron et al. | |
| 4,742,451 A | 5/1988 | Bruckert et al. | |
| 4,745,544 A | 5/1988 | Renner et al. | |
| 4,777,587 A | 10/1988 | Case et al. | |
| 4,833,657 A | 5/1989 | Tanaka | |
| 4,866,664 A | 9/1989 | Burkhardt, Jr. et al. | |
| 4,868,735 A | 9/1989 | Moller et al. | |
| 4,992,934 A | 2/1991 | Portanova et al. | |

(Continued)

FOREIGN PATENT DOCUMENTS

EP              0 379 709           8/1990

(Continued)

OTHER PUBLICATIONS

Agarwal et al., "April: A Processor Architecture for Multiprocessing," Proceedings of the 17th Annual International Symposium on Computer Architecture, IEEE, pp. 104-114.

(Continued)

*Primary Examiner*—Brian R. Peugh
(74) *Attorney, Agent, or Firm*—Fish & Richardson P.C.

(57) ABSTRACT

A lookup mechanism provides an input value to a datapath element disposed in an execution datapath of a processor and causes the datapath element to compare the input value to stored identifier values. The lookup mechanism receives from the datapath element a result based on the comparison.

18 Claims, 7 Drawing Sheets

U.S. PATENT DOCUMENTS

| | | |
|---|---|---|
| 5,008,808 A | 4/1991 | Fries et al. |
| 5,073,864 A | 12/1991 | Methvin et al. |
| 5,113,516 A | 5/1992 | Johnson |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,166,872 A | 11/1992 | Weaver et al. |
| 5,168,555 A | 12/1992 | Byers et al. |
| 5,173,897 A | 12/1992 | Schrodi et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fujiwara et al. |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,109 A | 7/1997 | Griesmer et al. |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,717,760 A | 2/1998 | Satterfield |
| 5,717,898 A | 2/1998 | Kagan et al. |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,839 A | 9/1998 | Hoyt et al. |
| 5,812,868 A | 9/1998 | Moyer et al. |
| 5,813,031 A | 9/1998 | Chou et al. |
| 5,815,714 A | 9/1998 | Shridhar et al. |
| 5,819,080 A | 10/1998 | Dutton et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,978,874 A | 11/1999 | Singhal et al. |
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,170 A | 2/2000 | Garger et al. |
| 6,029,228 A | 2/2000 | Cai et al. |
| 6,047,334 A | 4/2000 | Langendorf et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,076,129 A | 6/2000 | Fenwick et al. |

| | | | | | | |
|---|---|---|---|---|---|---|
| 6,076,158 | A | 6/2000 | Sites et al. | 6,523,108 | B1 | 2/2003 | James et al. |
| 6,079,008 | A | 6/2000 | Clery, III | 6,529,999 | B1 | 3/2003 | Keller et al. |
| 6,079,014 | A | 6/2000 | Papworth et al. | 6,532,509 | B1 | 3/2003 | Wolrich et al. |
| 6,085,215 | A | 7/2000 | Ramakrishnan et al. | 6,539,439 | B1 | 3/2003 | Nguyen et al. |
| 6,085,294 | A | 7/2000 | Van Doren et al. | 6,552,826 | B2 | 4/2003 | Adler et al. |
| 6,092,127 | A | 7/2000 | Tausheck | 6,560,667 | B1 | 5/2003 | Wolrich et al. |
| 6,092,158 | A | 7/2000 | Harriman et al. | 6,570,877 | B1 | 5/2003 | Kloth et al. |
| 6,092,175 | A | 7/2000 | Levy et al. | 6,577,542 | B2 | 6/2003 | Wolrich et al. |
| 6,112,016 | A | 8/2000 | MacWilliams et al. | 6,581,124 | B1 | 6/2003 | Anand |
| 6,115,811 | A | 9/2000 | Steele, Jr. | 6,584,522 | B1 | 6/2003 | Wolrich et al. |
| 6,134,665 | A | 10/2000 | Klein et al. | 6,587,906 | B2 | 7/2003 | Wolrich et al. |
| 6,141,348 | A | 10/2000 | Muntz | 6,606,704 | B1 | 8/2003 | Adiletta et al. |
| 6,141,689 | A | 10/2000 | Ysrebi | 6,625,654 | B1 | 9/2003 | Wolrich et al. |
| 6,141,765 | A | 10/2000 | Sherman | 6,628,652 | B1 | 9/2003 | Chrin et al. |
| 6,144,669 | A | 11/2000 | Williams et al. | 6,629,237 | B2 | 9/2003 | Wolrich et al. |
| 6,145,054 | A | 11/2000 | Mehrotra et al. | 6,631,430 | B1 | 10/2003 | Wolrich et al. |
| 6,145,123 | A | 11/2000 | Torrey et al. | 6,631,462 | B1 | 10/2003 | Wolrich et al. |
| 6,157,955 | A | 12/2000 | Narad et al. | 6,633,938 | B1 | 10/2003 | Rowlands et al. |
| 6,160,562 | A | 12/2000 | Chin et al. | 6,643,726 | B1 | 11/2003 | Patkar et al. |
| 6,173,349 | B1 | 1/2001 | Qureshi et al. | 6,654,836 | B1 | 11/2003 | Misra et al. |
| 6,182,177 | B1 | 1/2001 | Harriman | 6,661,794 | B1 | 12/2003 | Wolrich et al. |
| 6,195,676 | B1 | 2/2001 | Spix et al. | 6,661,795 | B1 | 12/2003 | Adas et al. |
| 6,199,133 | B1 | 3/2001 | Schnell | 6,667,920 | B2 | 12/2003 | Wolrich et al. |
| 6,201,807 | B1 | 3/2001 | Prasanna | 6,668,311 | B2 | 12/2003 | Hooper et al. |
| 6,212,542 | B1 | 4/2001 | Kahle et al. | 6,668,317 | B1 | 12/2003 | Bernstein et al. |
| 6,212,602 | B1 | 4/2001 | Wicki et al. | 6,671,761 | B2 | 12/2003 | Kim |
| 6,212,611 | B1 | 4/2001 | Nizar et al. | 6,671,827 | B2 | 12/2003 | Guilford et al. |
| 6,216,220 | B1 | 4/2001 | Hwang | 6,678,248 | B1 | 1/2004 | Haddock et al. |
| 6,223,207 | B1 | 4/2001 | Lucovsky et al. | 6,681,300 | B2 | 1/2004 | Wolrich et al. |
| 6,223,238 | B1 | 4/2001 | Meyer et al. | 6,694,380 | B1 | 2/2004 | Wolrich et al. |
| 6,223,277 | B1 | 4/2001 | Karguth | 6,697,923 | B2 | 2/2004 | Chen et al. |
| 6,223,279 | B1 | 4/2001 | Nishimura et al. | 6,724,767 | B1 | 4/2004 | Chong et al. |
| 6,230,119 | B1 | 5/2001 | Mitchell | 6,725,313 | B1 | 4/2004 | Wingard et al. |
| 6,230,261 | B1 | 5/2001 | Henry et al. | 6,728,845 | B2 | 4/2004 | Adiletta et al. |
| 6,233,599 | B1 | 5/2001 | Nation et al. | 6,738,831 | B2 | 5/2004 | Wolrich et al. |
| 6,247,025 | B1 | 6/2001 | Bacon | 6,754,662 | B1 | 6/2004 | Li |
| 6,247,040 | B1 | 6/2001 | Born et al. | 6,754,795 | B2 | 6/2004 | Chen et al. |
| 6,247,086 | B1 | 6/2001 | Allingham | 6,781,992 | B1 | 8/2004 | Rana et al. |
| 6,249,829 | B1 | 6/2001 | Bloks et al. | 6,785,843 | B1 | 8/2004 | McRae et al. |
| 6,256,713 | B1 | 7/2001 | Audityan et al. | 6,823,399 | B2 | 11/2004 | Horiguchi et al. |
| 6,272,616 | B1 | 8/2001 | Fernando et al. | 6,826,180 | B1 | 11/2004 | Bergantino et al. |
| 6,275,505 | B1 | 8/2001 | O'Loughlin et al. | 6,847,645 | B1 | 1/2005 | Potter et al. |
| 6,278,289 | B1 | 8/2001 | Guccione et al. | 6,868,476 | B2 | 3/2005 | Rosenbluth et al. |
| 6,279,113 | B1 | 8/2001 | Vaidya | 6,889,319 | B1 | 5/2005 | Rodgers et al. |
| 6,289,011 | B1 | 9/2001 | Seo et al. | 6,941,438 | B2 | 9/2005 | Wolrich et al. |
| 6,298,370 | B1 | 10/2001 | Tang et al. | 6,958,973 | B1 | 10/2005 | Chen et al. |
| 6,307,789 | B1 | 10/2001 | Wolrich et al. | 7,051,329 | B1 | 5/2006 | Boggs et al. |
| 6,311,256 | B2 | 10/2001 | Halligan et al. | 2001/0043614 | A1 | 11/2001 | Viswanadham et al. |
| 6,324,624 | B1 | 11/2001 | Wolrich et al. | 2002/0053017 | A1 | 5/2002 | Adiletta et al. |
| 6,345,334 | B1 | 2/2002 | Nakagawa et al. | 2002/0056037 | A1 | 5/2002 | Wolrich et al. |
| 6,347,344 | B1 | 2/2002 | Baker et al. | 2003/0012198 | A1 | 1/2003 | Kaganoi et al. |
| 6,351,808 | B1 | 2/2002 | Joy et al. | 2003/0041216 | A1 | 2/2003 | Rosenbluth et al. |
| 6,356,962 | B1 | 3/2002 | Kasper et al. | 2003/0041228 | A1 | 2/2003 | Rosenbluth et al. |
| 6,357,016 | B1 | 3/2002 | Rodgers et al. | 2003/0046488 | A1 | 3/2003 | Rosenbluth et al. |
| 6,360,262 | B1 | 3/2002 | Guenthner et al. | 2003/0065862 | A1 | 4/2003 | Wyland |
| 6,366,978 | B1 | 4/2002 | Middleton et al. | 2003/0078950 | A1 | 4/2003 | Abernathy et al. |
| 6,373,848 | B1 | 4/2002 | Allison et al. | 2003/0105899 | A1 | 6/2003 | Rosenbluth et al. |
| 6,378,124 | B1 | 4/2002 | Bates et al. | 2003/0145155 | A1 | 7/2003 | Wolrich et al. |
| 6,389,449 | B1 | 5/2002 | Nemirovsky et al. | 2003/0145159 | A1 | 7/2003 | Adiletta et al. |
| 6,393,483 | B1 | 5/2002 | Latif et al. | 2003/0191866 | A1 | 10/2003 | Wolrich et al. |
| 6,401,149 | B1 | 6/2002 | Dennin et al. | 2004/0034743 | A1 | 2/2004 | Wolrich et al. |
| 6,415,338 | B1 | 7/2002 | Habot | 2004/0039895 | A1 | 2/2004 | Wolrich et al. |
| 6,426,940 | B1 | 7/2002 | Seo et al. | 2004/0054880 | A1 | 3/2004 | Bernstein et al. |
| 6,427,196 | B1 | 7/2002 | Adiletta et al. | 2004/0071152 | A1 | 4/2004 | Wolrich et al. |
| 6,430,626 | B1 | 8/2002 | Witkowski et al. | 2004/0073728 | A1 | 4/2004 | Wolrich et al. |
| 6,430,646 | B1 | 8/2002 | Thusoo et al. | 2004/0073778 | A1 | 4/2004 | Adiletta et al. |
| 6,434,145 | B1 | 8/2002 | Opsasnick et al. | 2004/0098496 | A1 | 5/2004 | Wolrich et al. |
| 6,449,289 | B1 | 9/2002 | Quicksall | 2004/0109369 | A1 | 6/2004 | Wolrich et al. |
| 6,457,078 | B1 | 9/2002 | Magro et al. | 2004/0139290 | A1 | 7/2004 | Wolrich et al. |
| 6,463,072 | B1 | 10/2002 | Wolrich et al. | 2004/0205747 | A1 | 10/2004 | Bernstein et al. |
| 6,490,642 | B1 | 12/2002 | Thekkath et al. | | | | |
| 6,496,925 | B1 | 12/2002 | Rodgers et al. | | | | |
| 6,505,229 | B1 | 1/2003 | Turner et al. | | | | |

2005/0185437 A1 8/2005 Wolrich et al.

FOREIGN PATENT DOCUMENTS

| EP | 0 464 715 | 1/1992 |
| --- | --- | --- |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| JP | 59-111533 | 6/1984 |
| WO | WO 94/15287 | 7/1994 |
| WO | WO 97/38372 | 10/1997 |
| WO | WO 00/33195 | 6/2000 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01 50247 | 7/2001 |
| WO | WO 01/50679 | 7/2001 |

OTHER PUBLICATIONS

Chang et al., "Branch Classification: A New Mechanism For Improving Branch Predictor Performance," IEEE, pp. 22-31 (1994).

Farkas et al., "The multicluster architecture: reducing cycle time through partitioning," IEEE, vol. 30, Dec. 1997, pp. 149-159.

Hennessy et al., "Computer Organization and Design: The Hardware/Software Interface," Morgan Kaufman Publishers, 1998, pp. 116-119, 181-182, 225-227, 466-470, 476-482, 510-519, 712.

Intel, "1A-64 Application Developer's Architecture Guide," Rev.1. 0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Mendelson A. et al., "Design Alternatives of Multithreaded Architecture", *International Journal of Parallel Programming*, Plenum Press, New York, 27(3):161-193, Jun. 1999.

Paver et al., "Register Locking in Asynchronous Processor Computer Design: VLSI Processors," ICCD '92 Proceedings, IEEE 1992 International Conference, 1992, pp. 351-355.

Wadler, "The Concatenate Vanishes," University of Glasgow, Dec. 1987 (revised Nov. 1989), pp. 1-7.

Waldspurger et al., "Register Relocation: Flexible Contents for Multithreading," Proceedings of the 20th Annual International Symposium on Computer Architecture, 1993, pp. 120-130.

"HART, Field Communications Protocol, Application Guide", 'Online! 1999, Hart Communication Foundation, Austin, TX, XP002219606, http://Ihe-div.web.cerp.ch/Ihe-div/IAS/WS/WorldFip/I.abo/appguide.pdf,79 pages.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, 2$^{nd}$ ed., Microsoft Press, Redmond, Washington, USA, 1994. p. 326.

Fillo et al., "The M-Machine Multicomputer." IEEE Proceedings of MICRO-28, 1995, pp. 146-156.

Gomez, et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS proccessor with a reconfigurable coprocessor," Proceedings of the 5$^{th}$ Annual IEEE Symposium on Field-Programmable Custon Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Romilly Bowden, "What is HART?." Romilly's Hart and Fieldbus Web Site, Online!, 1977, XP002219605, http://www.romilly.co.uk/whathart.htm.

Schmidt et al., "The Performance of Alternative Threading Architectures for Parallel Communication Subsystems," Internet Document, *Online*!, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28$^{th}$ Annual Hawaii International Conference on System Sciences, 1995, pp. 191-201.

Trimberger et al. "A time-multiplexed FPGA." Proceedings of the 5$^{th}$ Annual IEEE Symposium on Field-Programmable Custom Computing Machines, 1998.

Turner et al.. "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

U.S. Appl. No. 09/473,571, filed Dec. 28, 1999, Wolrich et al.

U.S. Appl. No. 09/475,614, filed Dec. 30, 1999, Wolrich et al.

"Intel IXP1200 Network Processor Family", Hardware Reference Manual, 272 pages (Dec. 2001).

"IXP1200 Network Processor", Data Sheet, 144 pages (Mar. 2000).

*C-5 Network Processor Architecture Guide*, C-Port Corporation, Freescale Semiconductor, Inc., Part No. C5NPD0-AG/D, May 31, 2001, 642 pages.

Chang, Shu-Ping et al., "An Overview of the Pipelined Common Buffer Architecture (PCBA) for Memory Based Packet/Cell Switching Systems", *IEEE*, pp. 288-297 (1994).

Frazier, Gregory L. et al., "The Design and Implementation of a Multi-Queue Buffer For VLSI Communication Switches", *IEEE*, pp. 466-471 (1989).

Lin, Yu-Sheng et al., "Queue Management for Shared Buffer and Shared Multi-buffer ATM Switches", *IEEE*, pp. 688-695 (1996).

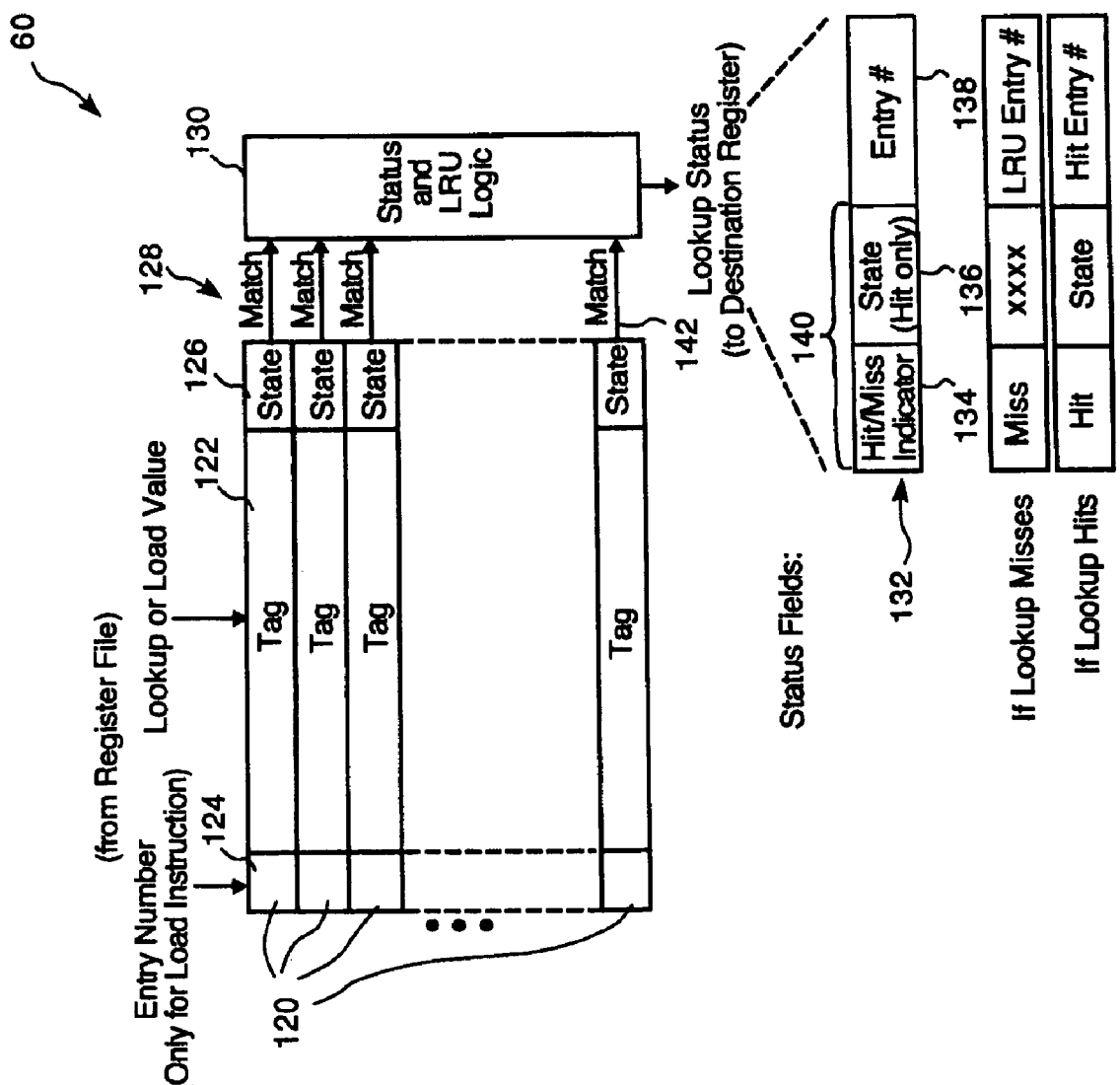

US 7,246,197 B2

SOFTWARE CONTROLLED CONTENT ADDRESSABLE MEMORY IN A GENERAL PURPOSE EXECUTION DATAPATH

CROSS REFERENCE TO RELATED APPLICATIONS

This application claims priority from U.S. patent application Ser. No. 10/212,943, filed now U.S. Pat. No. 6,868, 476 Aug. 5, 2002 and U.S. Provisional Patent Application Ser. No. 60/315,144 filed Aug. 27, 2001. The disclosure of the prior application is considered part of (and is incorporated by reference in) the disclosure of this application.

BACKGROUND

For maximum efficiency, network processors should be able to process packets at a rate at least equal to the line rate. Packet processing typically involves writes to and reads from external memory. Because of slower memory access speeds, current network processors may lack the necessary speed to process packets at the line speeds.

DESCRIPTION OF DRAWINGS

FIG. 4 is a block diagram of the CAM of FIG. 2.

DETAILED DESCRIPTION

Figure 1:
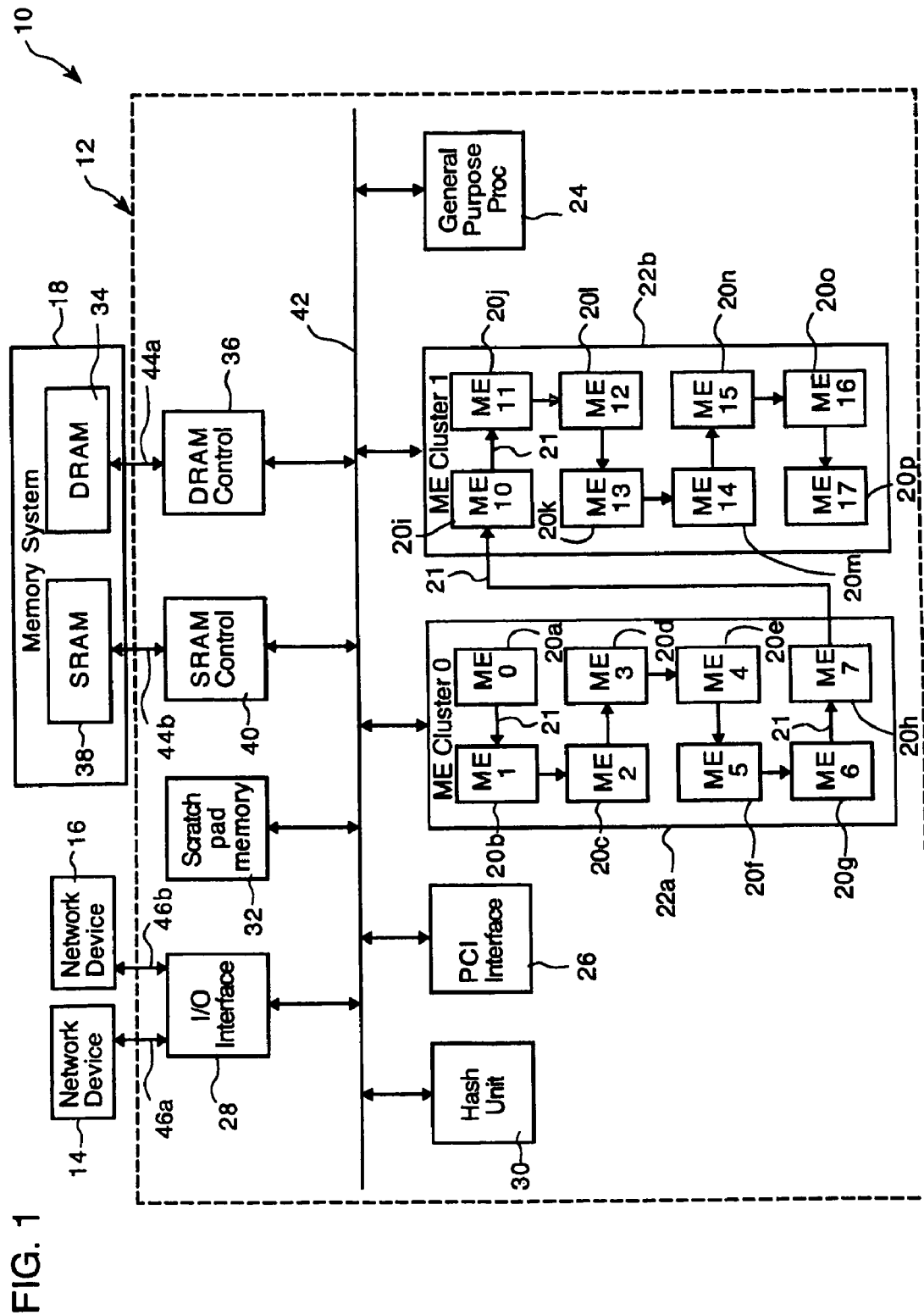
FIG. 1 is a block diagram of a communication system employing a processor having multithreaded microengines to support multiple threads of execution.

Referring to FIG. 1, a communication system 10 includes a processor 12 coupled to one or more I/O devices, for example, network devices 14 and 16, as well as a memory system 18. The processor 12 is multi-threaded processor and, as such, is especially useful for tasks that can be broken into parallel subtasks or functions. In one embodiment, as shown in the figure, the processor 12 includes multiple microengines 20, each with multiple hardware controlled program threads that can be simultaneously active and independently work on a task. In the example shown, there are sixteen microengines 20, microengines 20a-20p (corresponding to microengines 0 through 15), and each of the microengines 20 is capable of processing multiple program threads, as will be described more fully below. The maximum number of context threads supported in the illustrated embodiment is eight, but other maximum amount could be provided. Each of the microengines 20 is connected to and can communicate with adjacent microengines via next neighbor lines 21, as shown. In the illustrated embodiment, the microengines 0-7 are organized as a first cluster (ME Cluster 0) 22a and the microengines 8-15 are organized as a second cluster (ME Cluster 1) 22b.

The processor 12 also includes a processor 24 that assists in loading microcode control for other resources of the processor 12 and performs other general purpose computer type functions such as handling protocols and exceptions, as well as provides support for higher layer network processing tasks that cannot be handled by the microengines. In one embodiment, the processor 24 is a StrongARM (ARM is a trademark of ARM Limited, United Kingdom) core based architecture. The processor (or core) 24 has an operating system through which the processor 24 can call functions to operate on the microengines 20. The processor 24 can use any supported operating system, preferably a real-time operating system. Other processor architectures may be used.

The microengines 20 each operate with shared resources including the memory system 18, a PCI bus interface 26, an I/O interface 28, a hash unit 30 and a scratchpad memory 32. The PCI bus interface 26 provides an interface to a PCI bus (not shown). The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., processing of payloads from network packets. The SRAM 38 and SRAM controller 40 are used in a networking implementation for low latency, fast access tasks, e.g., accessing look-up tables, memory for the processor 24, and so forth. The SRAM controller 40 includes a data structure (queue descriptor cache) and associated control logic to support efficient queue operations, as will be described in further detail later. The microengines 20a-20p can execute memory reference instructions to either the DRAM controller 36 or the SRAM controller 40.

The devices 14 and 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown) that transmits packet data to the processor 12 and device 16 could be a switch fabric device that receives processed packet data from processor 12 for transmission onto a switch fabric. In such an implementation, that is, when handling traffic to be sent to a switch fabric, the processor 12 would be acting as an ingress network processor. Alternatively, the processor 12 could operate as an egress network processor, handling traffic that is received from a switch fabric (via device 16) and destined for another network device such as network device 14, or network coupled to such device. Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 includes separate receive and transmit blocks, each being separately configurable for a particular interface supported by the processor 12.

Other devices, such as a host computer and/or PCI peripherals (not shown), which may be coupled to a PCI bus controlled by the PC interface 26 are also serviced by the processor 12.

In general, as a network processor, the processor 12 can interface to any type of communication device or interface that receives/sends large amounts of data. The processor 12 functioning as a network processor could receive units of packet data from a network device like network device 14 and process those units of packet data in a parallel manner, as will be described. The unit of packet data could include an entire network packet (e.g., Ethernet packet) or a portion of such a packet, e.g., a cell or packet segment.

Each of the functional units of the processor 12 is coupled to an internal bus structure 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
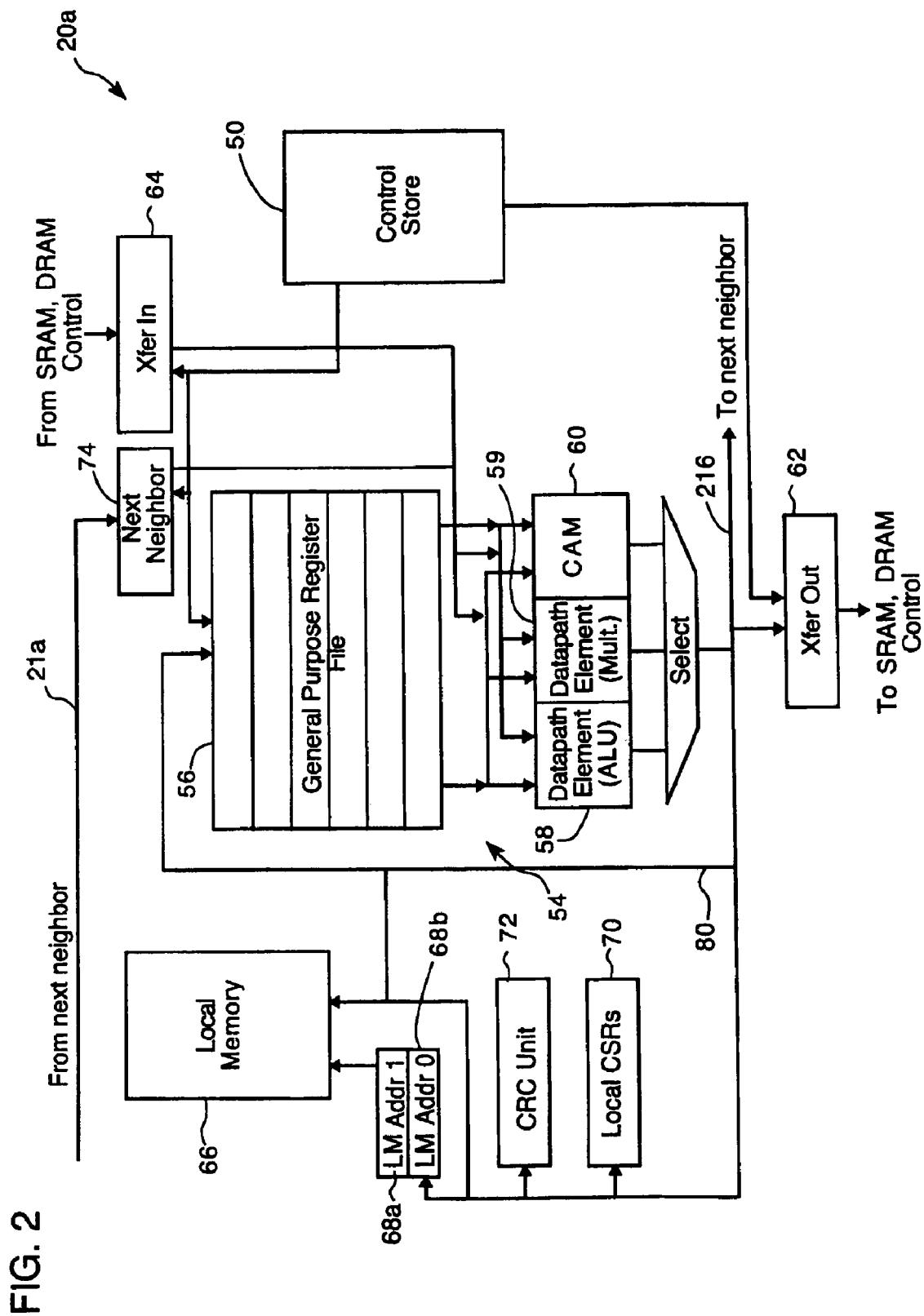
FIG. 2 is a block diagram of a programmable processor datapath (of the microengine from FIG. 1) that includes a CAM.

Referring to FIG. 2, an exemplary one of the microengines 20a is shown. The microengine (ME) 20a includes a control store 50 for storing a microprogram. The microprogram is loadable by the processor 24.

The microengine 20a also includes an execution datapath 54 and at least one general purpose register (GPR) file 56 that are coupled to the control store 50. The datapath 54 includes several datapath elements, including an ALU 58, a multiplier 59 and a Content Addressable Memory (CAM) 60. The GPR file 56 provides operands to the various datapath processing elements including the CAM 60. Opcode bits in the instruction select which datapath element is to perform the operation defined by the instruction.

The microengine 20a further includes a write transfer register file 62 and a read transfer register file 64. The write transfer register file 62 stores data to be written to a resource external to the microengine (for example, the DRAM memory or SRAM memory). The read transfer register file 64 is used for storing return data from a resource external to the microengine 20a. Subsequent to or concurrent with the data arrival, an event signal from the respective shared resource, e.g., memory controllers 36, 40, or core 24, can be provided to alert the thread that the data is available or has been sent. Both of the transfer register files 62, 64 are connected to the datapath 54, as well as the control store 50.

Also included in the microengine 20a is a local memory 66. The local memory 66 is addressed by registers 68a, 68b, which supplies operands to the datapath 54. The local memory 66 receives results from the datapath 54 as a destination. The microengine 20a also includes local control and status registers (CSRs) 70, coupled to the transfer registers, for storing local inter-thread and global event signaling information and other information, and a CRC unit 72, coupled to the transfer registers, which operates in parallel with the execution datapath 54 and performs CRC computations for ATM cells. The microengine 20a also includes next neighbor registers 74, coupled to the control store 50 and the execution datapath 54, for storing information received from a previous neighbor ME in pipeline processing over a next neighbor input signal 21a, or from the same ME, as controlled by information in the local CSRs 70.

In addition to providing an output to the write transfer unit 62, the datapath can also provide an output to the GPR file 56 over line 80. Thus, each of the datapath elements, including the CAM 60 that can return a result value from an executed. A next neighbor output signal 21b to a next neighbor ME in the processing pipeline can be provided under the control of the local CSRs 80.

Other details of the microengine have been omitted for simplification. However, it will be appreciated that the microengine would include (and the control store 50 would be coupled to) appropriate control hardware, such as program counters, instruction decode logic and context arbiter/event logic, needed to support multiple execution threads.

Figure 3:
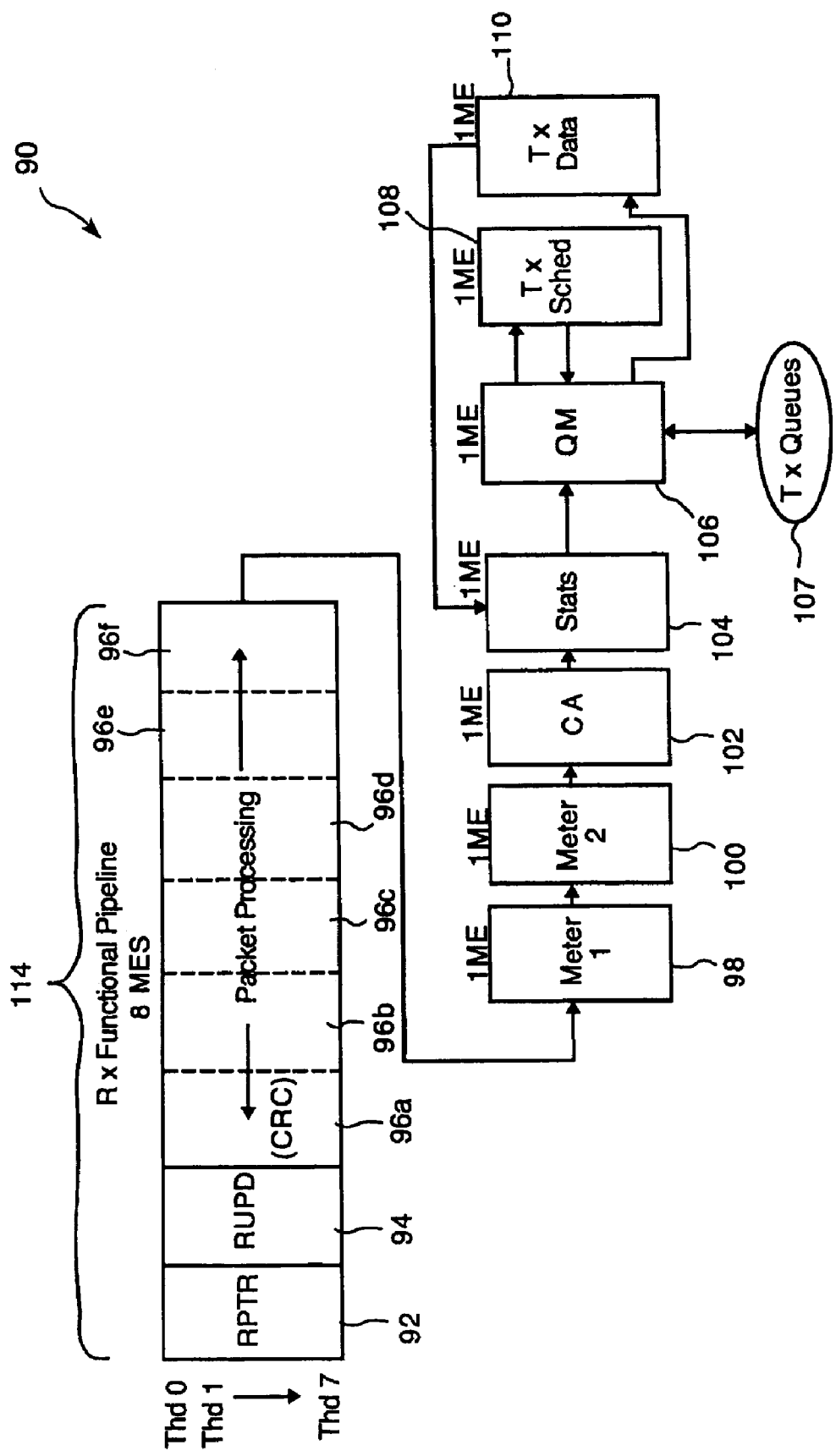
FIG. 3 is a diagram depicting the microengines as a multi-stage, packet processing pipeline.

Referring to FIG. 3, an exemplary ME task assignment for a software pipeline model of the processor 12 is illustrated in 90. The processor 12 supports two pipelines: a receive pipeline and a transmit pipeline. The receive pipeline includes the following stages: re-assembly pointer search ("RPTR") 92, re-assembly information update ("RUPD") 94, receive packet processing (six stages) 96a-96f, metering stages ME1 98 and ME2 100, congestion avoidance ("CA") 102, statistics processing 104 and a queue manager ("QM") 106. The receive pipeline begins with data arriving in a receive block of the I/O interface 28 and ends with transmits queues 107 (stored in SRAM). The transmit pipeline stages include: a TX scheduler 108, the QM 106, a Transmit Data stage 110 and the statistics processing 104.

The RPTR, RUPD and packet processing pipe stages work together to re-assemble segmented frames back into complete packets. The RPTR stage 92 finds the pointer to the reassembly state information in the SRAM 38 and passes this pointer to the RUPD 98. The RUPD 98 manages the reassembly state, which involves allocating DRAM buffers, and calculating offsets, byte counts and other variables, and provides the packet processing stage 96 with a pointer to the location in DRAM where the network data should be assembled.

The threads of the packet processing stages 96 complete the re-assembly process by writing the data (payload) to the allocated DRAM buffer and also look at the L2 through L7 packet headers to process the packet. These stages are application dependent and can therefore vary from one application to another. For example, one application may support IP destination searches to determine destination port, and a 7-tuple search to identify flows and support access lists.

To support ATM re-assembly, the RX pipeline requires a cyclic redundancy code (CRC) stage in addition to the pipe stages already described. CRC support can be provided by replacing the first one of the packet processing stages (stage 96a, as shown) and including additional information in the re-assembly state table. The CRC 96a reads the re-assembly state to get the AAL type and CRC residue, verifies the Virtual Circuit (VC) is configured for AALS, performs CRC calculation over the cell, and updates the CRC residue in the re-assembly state.

Metering 98, 100 is used to monitor bandwidth of a flow. It checks whether each incoming packet is in profile or not. When a connection is made, a set of parameters are negotiated, e.g., Committed Information Rate (CIR) and Committed Burst Size (CBS), which define the bandwidth used by the flow. The metering function can be implemented according to any one of a number of known schemes, such as token bucket.

Congestion avoidance 102 monitors network traffic loads in an effort to anticipate and avoid congestion at common network bottlenecks.

The QM 106 is responsible for performing enqueue and dequeue operations on the transmit queues 107 for all packets, as will be described in further detail below.

The receive pipeline threads parse packet headers and perform lookups based on the packet header information. Once the packet has been processed, it is either sent as an exception to be further processed by the core 24, or stored in the DRAM 34 and queued in a transmit queue by placing a packet link descriptor for it in a transmit queue associated with the transmit (forwarding port) indicated by the header/lookup. The transmit queue is stored in the SRAM 38. The transmit pipeline schedules packets for transmit data processing, which then sends the packet out onto the forwarding port indicated by the header/lookup information during the receive processing.

Collectively, the stages 92, 94, and 96a-96f form a functional pipeline. The functional pipeline uses 8 microengines (MEs) in parallel, and each of the eight threads (threads 0 through 7) in each ME is assigned a single packet for processing. Consequently, at any one time there are 64 packets in the pipeline. Each stage executes at one packet arrival rate times execution period of eight threads.

The stages 98, 100, 102, 104, 106, 108 and 110 are context pipe-stages and, as such, are each handled by a single (different) ME. Each of the eight threads in each stage handles a different packet.

Some of the pipe stages, such as CRC 96a, RUPD 94, QM 106, for example, operate on a "critical section" of code, that is, a code section for which only one ME thread has exclusive modification privileges for a global resource at any one time. These privileges protect coherency during read-modify-write operations. Exclusive modification privileges between MEs are handled by allowing only one ME (one stage) to modify the section. Thus, the architecture is designed to ensure that an ME not transition into a critical section stage until a previous ME has completed its processing in the critical section. For example, the RUPD 98 is a critical section that requires mutual exclusivity to shared tables in external memory. Thus, when transitioning from RPTR 92 to RUPD 94, thread 0 of ME1 of the RUPD 94 will not begin until all threads on ME 0 having completed the previous RUPD pipe stage. In addition, strict thread order execution techniques are employed in the pipeline at critical section code points to ensure sequence management of packets being handled by the different threads.

The processor 12 also supports the use of caching mechanisms to reduce packet processing times and improve the speed at which the processor 12 operates with respect to incoming traffic. For example, the SRAM controller 40 (FIG. 1) maintains a cache of most recently used queue descriptors (stored in the SRAM 38), as will be further described. Also, the local memory 66 (FIG. 2) caches CRC information, such as CRC residue (also stored in the SRAM) 38, used by the CRC 96a. If more than one thread in a pipe stage such as the QM 106 is required to modify the same critical data, a latency penalty is incurred if each thread reads the data from external memory (that is, SRAM), modifies it and writes the data back to external memory. To reduce the latency penalty associated with the read and write, the ME threads can use the ME CAM 60 (FIG. 2) to fold these operations into a single read, multiple modifications and, depending on the cache eviction policy, either one or more write operations, as will be described.

FIG. 4 shows an exemplary embodiment of the CAM 60. The CAM 60 includes a plurality of entries 120. In the illustrated embodiment, there are 16 entries. Each entry 120 has an identifier value (or tag) 122, e.g., a queue number or memory address that can be compared against an input lookup value. Each entry also includes an entry number 124 and state information 126 associated with the identifier 122 in that same entry. Compare results 128 are provided to a Status and LRU logic unit 130, which produces a lookup result 132. The lookup result 132 includes a hit/miss indicator 134, state information 136 and an entry number 138. Collectively, the fields 134 and 136 provide status 140.

The width of the identifiers 122 is the same as the source registers being used to provide load the CAM entries or provide lookup values, e.g., the registers of the GPR file 56 (FIG. 3). In the embodiment shown, the state information 126 is implemented as a state bit. The width and format of the state information, and the number of identifiers are based on design considerations.

During a CAM lookup operation, the value presented from a source such as the GPR file 56 is compared, in parallel, to each identifier 122 with a resulting Match signal 142 per identifier. The values of each identifier were previously loaded by a CAM load operation. During that load operation, the values from the register file 56 specified which of the identifiers and the values of the identifiers to be loaded. The state information is also loaded into the CAM during the CAM load operation.

The identifier 122 is compared against the lookup value in a source operand by an instruction, e.g., Lookup[dest_reg, src_reg].

The source operand specified by the parameter "src_reg" holds the lookup value to be applied to the CAM 60 for lookup. The destination register specified by parameter "dest_reg" is the register that receives the result of the CAM lookup 60.

All entries 120 are compared in parallel. In one embodiment, the lookup result 132 is a 6-bit value which is written into the specified destination register in bits 8:3, with the other bits of the register set to zero. The destination register can be a register in the GPR file 56. Optionally, the lookup result 132 can also be written into either of the LM_ADDR registers 68a, 68b (FIG. 2) of the ME 22.

For a hit (that is, when the hit/miss indicator 134 of the result 132 indicates a hit), the entry number 138 is the entry number of the entry that matched. When a miss occurs and the hit/miss indicator 134 thus indicates a miss, the entry number 138 is the entry number of the Least Recently-Used (LRU) entry in the CAM array. The state information 136 is only useful for a hit and includes the value in the state field 126 for the entry that hit.

The LRU logic 130 maintains a time-ordered list of CAM entry usage. When an entry is loaded, or matches on a lookup, it is moved to a position of Most Recently Used (MRU), a lookup that misses does not modify the LRU list.

All applications can use the hit/miss indication 134. The entry number 138 and state information 136 provide additional information that may be used by some applications. On a miss, for example, the LRU entry number can be used as a hint for cache eviction. The software is not required to use the hint. The state information 136 is information produced and used only by software. It can differentiate different meanings for a hit, such as unmodified versus modified data. The software can use the information for branch decisions, as offset into data tables, among other uses.

Other instructions that use and manage the CAM can include:
Write [entry, src_reg], opt_tok;
Write_State (state_value, entry);
Read_Tag (dest_reg, entry);
Read_State (dest_reg, entry); and
Clear.

The Write instruction writes an identifier value in the src_reg to the specified CAM entry. An option token can be used to specify state information. The Read_Tag and Read_State instructions are used for diagnostics, but can also be used in normal functions. The tag value and state for the specified entry are written into the destination register. Reading the tag is useful in the case where an entry needs to be evicted to make room for a new value-that is, the lookup of the new value results in a miss, with the LRU entry number returned as a result of the miss. The read instruction can then be used to find the value that is stored in that entry. The Read_Tag instruction eliminates the need to keep the identifier value corresponding to the LRU entry number in another register. The Clear instruction is used to flush all information out of the CAM.

When the CAM is used as a cache tag store, and each entry is associated with a block of data in Local Memory 66, the result of the lookup can be used to branch on the hit/miss indicator 134 and use the entry number 138 as a base pointer into the block in Local Memory 66.

In another embodiment, the state 126 can be implemented as a single lock bit and the result 132 can be implemented to include a status code (instead of the separate indicator and state fields) along with the entry number 138. For example, the code could be defined as a two-bit code, with possible results to include a "miss" (code '01'), "hit" (code '10') and "locked" (code '11'). A return of the miss code would indicate that the lookup value is not in the CAM, and the entry number of the result value is the Least Recently Used (LRU) entry. As discussed above, this value could be used as a suggested entry to be replaced with the lookup value. A hit code would indicate that the lookup value is in the CAM and the lock bit is clear, with the entry number in the result being the entry number of the entry that has matched the lookup value. A locked code would indicate that the lookup value is in the CAM and the locked bit 126 is set, with the entry number that is provided in the result again being the entry number of the entry that matched the lookup value.

The lock bit 126 is a bit of data associated with the entry. The lock bit could be set or cleared by software, e.g., using a LOCK or UNLOCK instruction, at the time the entry is loaded, or changed in an already loaded entry. The lock bit 126 can be used to differentiate cases where the data associated with the CAM entry is in flight, or pending a change, as will be discussed in further detail later.

As mentioned earlier, a context pipe stage that uses critical data is the only ME that uses that critical data. Therefore, the replacement policy for the CAM entries is to replace the LRU only on CAM misses. On the other hand, a functional pipeline (like the pipeline 114 of FIG. 3) performs the same function on multiple MEs. In a functional pipeline, therefore, a given ME is required to evict all critical data to external memory before it exits a stage that uses critical data and also must ensure that the CAM is cleared prior to any threads using the CAM.

Before a thread uses the critical data, it searches the CAM using a critical data identifier such as a memory address as a lookup value. As described earlier, the search results in one of three possibilities: a "miss", a "hit" or a "lock". If a miss is returned, then data is not saved locally. The thread reads the data from external memory (that is, from the SRAM 38) to replace the LRU data. It evicts LRU data from local memory (SRAM controller cache, or local memory 66) back to external memory, optionally locks the CAM entry and issues a read to get the new critical data from external memory. In certain applications, as will be described later, the lock is asserted to indicate to other threads that the data is in the process of being read into local memory, or to indicate to the same thread (the thread that initiated the read) that the memory read is still in progress. Once the critical data is returned, the thread awaiting the data processes the data, makes any modifications to the data, writes it to local memory, updates the entry from which LRU data was evicted with the new data and unlocks the CAM entry.

If the result is a lock, the thread assumes that another ME thread is in the process of reading critical data and that it should not attempt to read the data. Instead, it tests the CAM at a later time and used the data when the lock is removed. When the result is a hit, then the critical data resides in local memory. Specific examples of CAM use will now be described with reference to FIGS. 5 through 8.

As discussed above, and as shown in FIG. 3, the processor 12 can be programmed to use one of the microengines 20 as the QM 106. The CAM 60 in the QM 106 serves as a tag store holding the tags of queue descriptors that are cached by the SRAM controller 40.

The QM 106 receives enqueue requests from the set of microengines functioning as the receive functional pipeline 114. The receive pipeline 114 is programmed to process and classify data packets received by one of the network devices 14, 16 (FIG. 1), e.g., the physical layer device 14. The enqueue requests specify which output queue an arriving packet should be sent to. The transmit scheduler 108 sends dequeue requests to the QM 106. The dequeue requests specify the output queue from which a packet is to be removed for transmittal to a destination via one of the network devices, 14, 16, e.g., the switch fabric 16.

An enqueue operation adds information that arrived in a data packet to one of the output queues and updates the corresponding queue descriptor. A dequeue operation removes information from one of the output queues and updates the corresponding queue descriptor, thereby allowing the network device 16 to transmit the information to the appropriate destination.

Figure 5A:
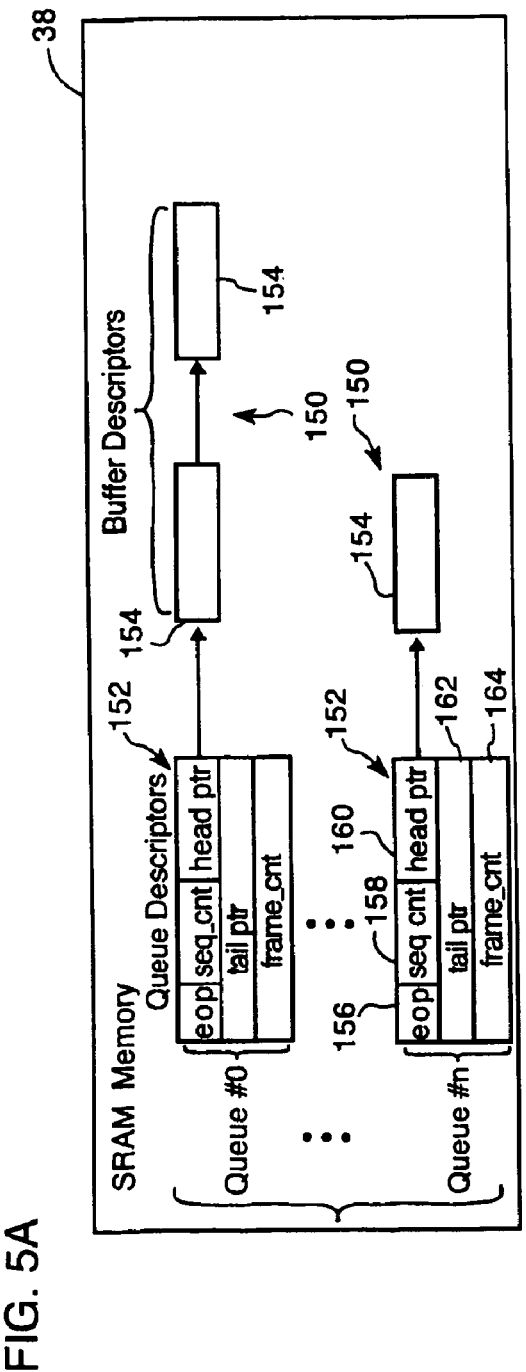
FIG. 5A is a depiction of a queue and queue descriptor in SRAM memory.

Referring to FIG. 5A, an example of "n" transmit queues 150 and their corresponding queue descriptors 152 residing in external memory (SRAM 38) is shown. Each output queue 150 includes a linked list of elements 154, each of which has a pointer with the address of the next element in the queue. Each element 154 also includes a pointer that points to information that is stored elsewhere and that the element represents. Typically, the pointer of the last element in the queue 150 contains a null value. The queue descriptor 152 includes an end of pointer EOP indicator 156, a segment count 158, a head pointer 160, a tail pointer 162 and a frame count 164. The descriptor 152 may also include other queue parameters (not shown). The head pointer 160 points to the first element of the transmit queue 150, and the tail pointer 30 points to the last element of the transmit queue 150. The segment count 158 identifies the number of elements in the transmit queue 150.

Figure 5B:
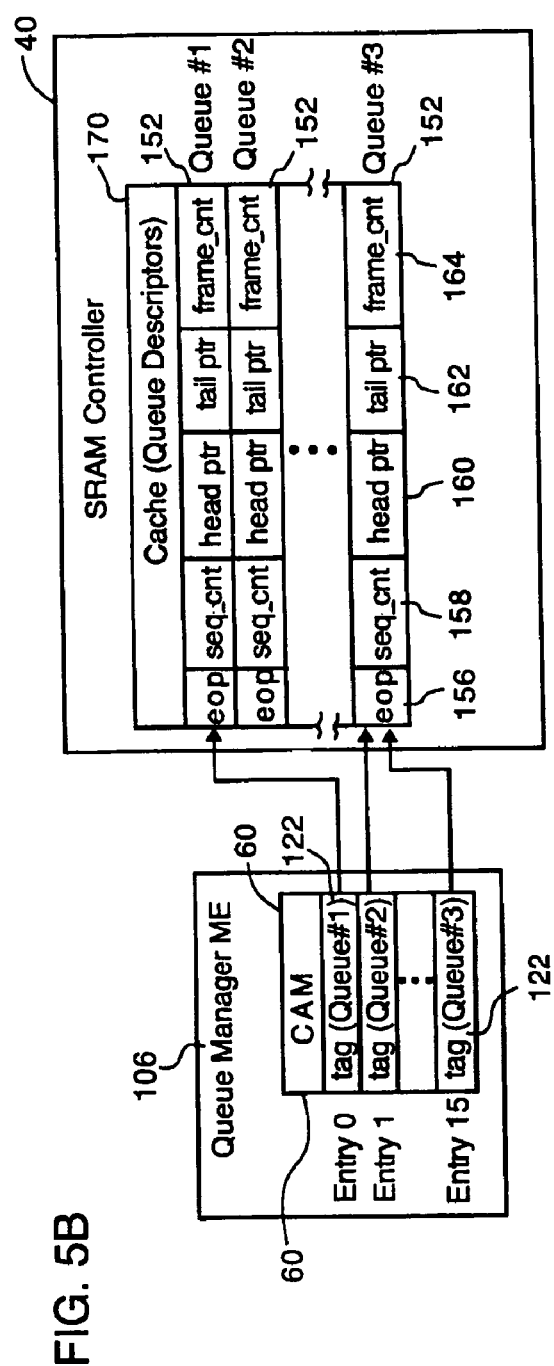
FIG. 5B is a depiction of a cache of queue descriptors and corresponding tag store implemented using the CAM (of FIG. 4).

Referring now to FIG. 5B, executing enqueue and dequeue operations for a large number of transmit queues 150 in the SRAM memory 38 at high-bandwidth line rates can be accomplished by storing some of the queue descriptors 152 in a cache 170 in the SRAM controller 40. The ME 20 executing as the queue manager 106 uses the identifiers 122 of the entries 120 in its CAM 60 to identify the memory addresses of the sixteen queue descriptors 152 most-recently used in enqueue or dequeue operations, that is the cached queue descriptors. The cache 170 stores the corresponding queue descriptors 152 (the EOP value 156, the segment count 158, the head pointer 160, tail pointer 162 and the frame count 164) stored at the addresses identified in the tag store (CAM 60).

The queue manager 106 issues commands to return queue descriptors 152 to memory 38 and fetch new queue descriptors 152 from memory such that the queue descriptors stored in the cache 170 remain coherent with the addresses in the tag store 60. The queue manager 106 also issues commands to the SRAM controller 38 to indicate which queue descriptor 152 in the cache 170 should be used to execute the command. The commands that reference the head pointer 160 or tail pointer 162 of a queue descriptor 152 in the cache 170 are executed in the order in which they arrive at the SRAM controller 38.

Locating the cache 170 of queue descriptors 152 at the memory controller 40 allows for low latency access to and from the cache 170 and the memory 38. Also, having the control structure for queue operations in a programming engine can allow for flexible high performance while using existing micro-engine hardware.

The threads associated with the QM 106 execute in strict order. The threads use local inter-thread signaling to maintain strict order. To ensure that the QM 106 keeps up with in an incoming line rate, each thread performs one enqueue and one dequeue operation in a time slot equal to the minimum frame arrive time.

Figure 6:
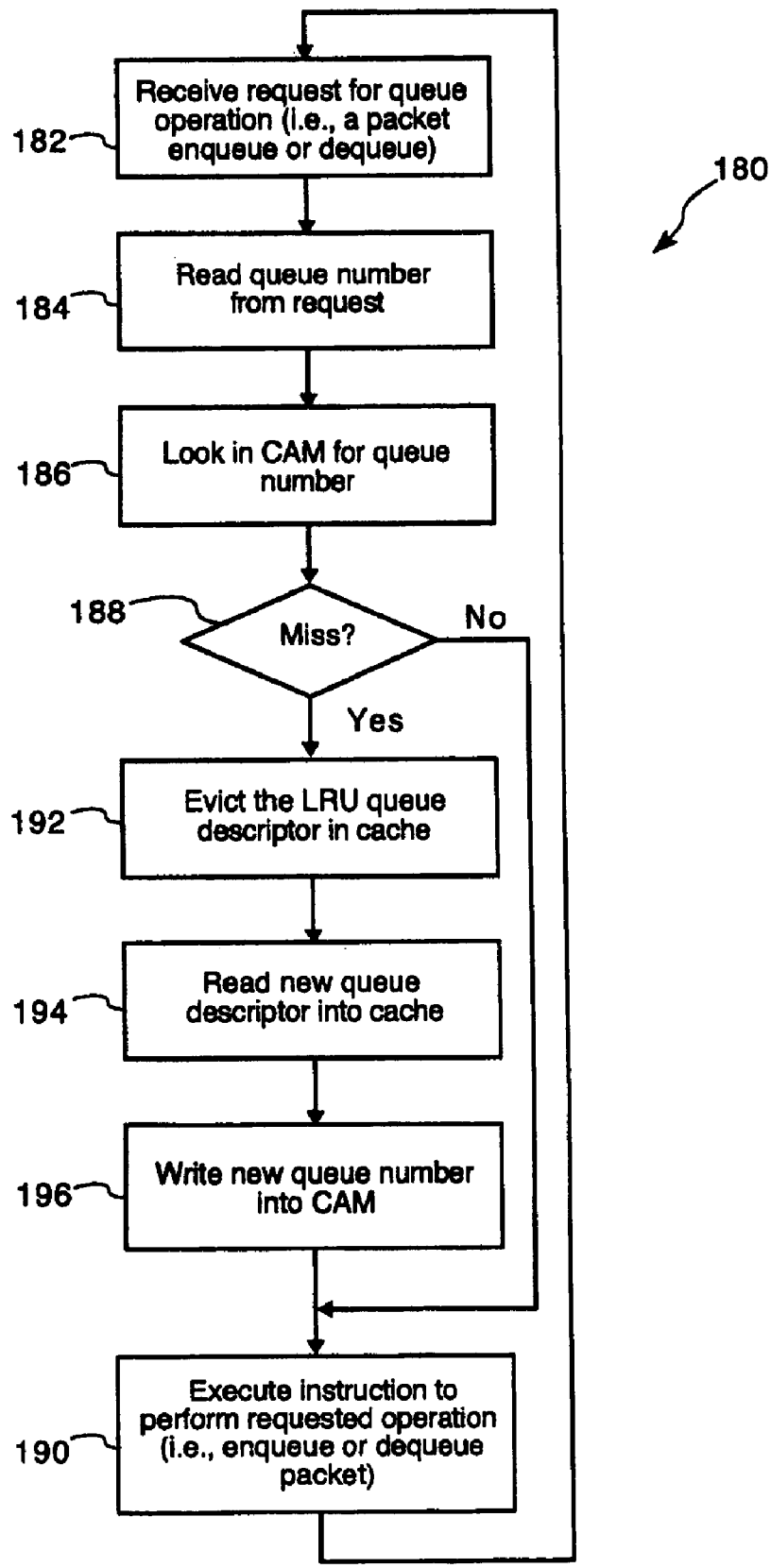
FIG. 6 is a flow diagram illustrating an exemplary use of the CAM during a queue operation by one of the microengines programmed to perform queue management.
Figure 7:
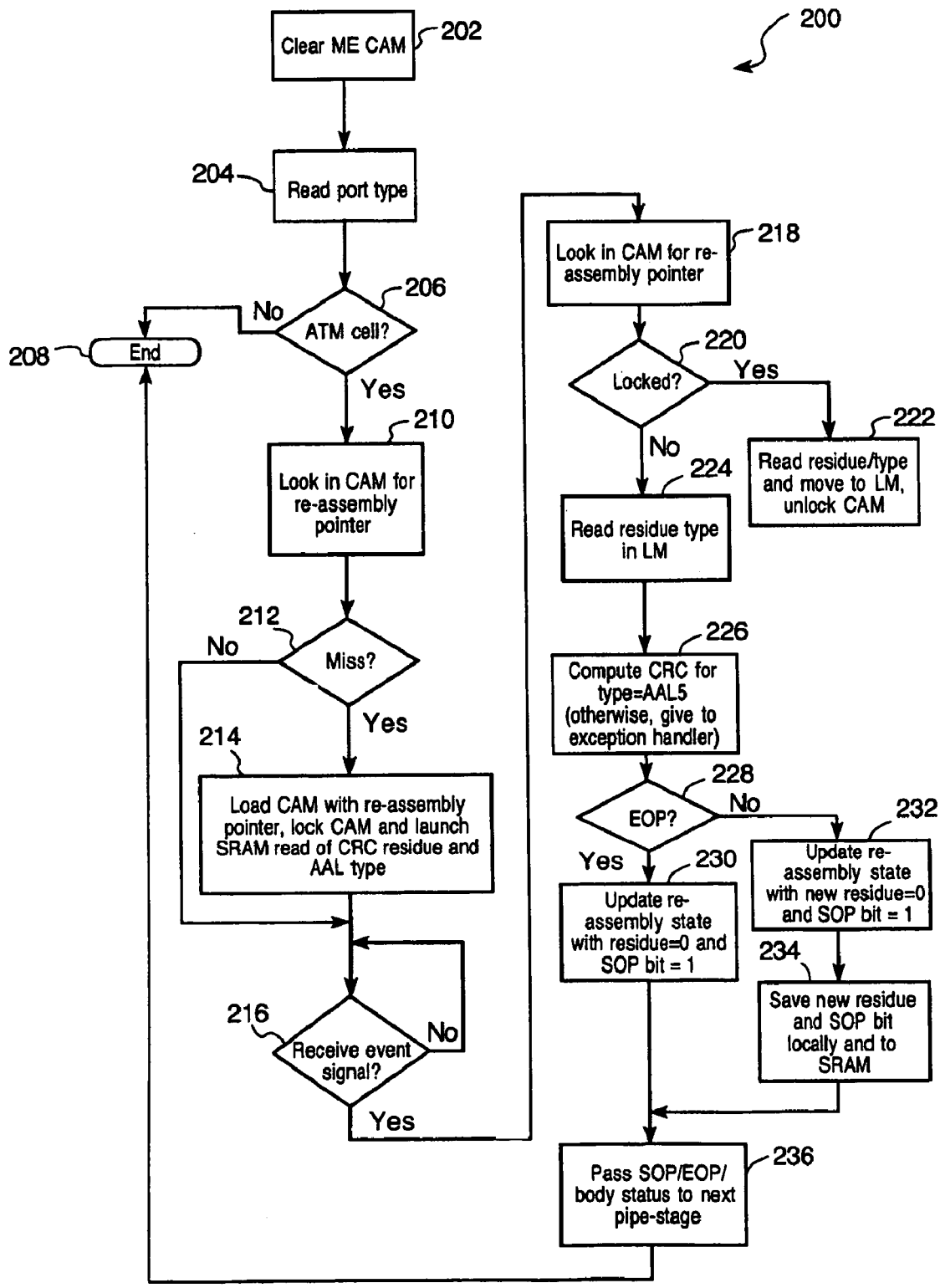
FIG. 7 is a flow diagram illustrating an exemplary use of the CAM to support Cyclic Redundancy Check (CRC) processing by one of the pipeline microengines programmed to perform CRC processing.

FIG. 6 illustrates an exemplary queue operation 180 (representing either an enqueue or dequeue operation) performed by the QM 106. The QM 106 receives 182 a request for a queue operation 182. The request is received from the CA content pipestage ME when it is an enqueue request and is received from the TX scheduler content pipe-stage ME when it is request for a dequeue operation. The QM 106 reads 184 a queue number from the request.

The QM 106 then uses its CAM to detect temporal dependencies between the queue specified in the request and the last 16 queues to which the QM 106 performed such an operation. Thus, the QM 106 performs a CAM lookup 186 based on the queue number identified in the request. If there is a dependency, i.e., the QM thread detects 188 a CAM hit, the latency of reading a queue descriptor is eliminated because the CAM hit indicates that the descriptor corresponding to the queue number is currently maintained in the queue descriptor cache 170 (FIG. 5B). In the event that a hit occurs, the QM 106 proceeds to execute an instruction 190 that commands the SRAM controller 40 to perform the requested operation.

If, at 188, it is determined that the CAM search results in a miss, the entry number of the least recently used CAM entry is returned to the QM 106. There is a direct mapping between the CAM entry and a cache entry (queue descriptor). In other words, an LRU CAM entry "n" indicates that the cache entry "n" should be evicted. Therefore, the QM 106 evicts 192 from the cache the queue descriptor corresponding to the queue number stored in the LRU CAM entry. Once the cache entry is evicted, the QM 106 reads 194 the "new" queue descriptor (that is, the queue descriptor of the queue number in the request) into the cache from the SRAM. The new queue descriptor includes the linked list head pointer (for dequeue) and tail pointer (for enqueue), and a count that indicates the number of frames or buffers on the queue (as shown in FIGS. 5A-5B). The QM 106 also stores 196 the queue number of the new queue descriptor in the CAM entry that had been identified as the LRU entry to replace the number of the evicted queue descriptor. The QM 106 executes an instruction 190 that commands the SRAM controller 40 to perform the requested operation.

The SRAM controller 40 performs the linked list operation for enqueue or dequeue.

When an operation of either type (enqueue or dequeue) is performed, the QM 106 sends a message to the TX scheduler 108. After a dequeue operation, the QM 106 passes a transmit request to the TX data context pipe-stage 110.

Another stage that uses the CAM 60 is the CRC processing pipe stage 96a. The ME 20 in this stage of the receive functional pipeline 114 uses its internal CAM 60 to maintain coherency of the CRC residue (in the re-assembly state table) between the eight threads executing the CRC processing pipe stage 96a.

Referring now to FIG. 7a CRC pipe-stage program flow 200, including the use of the CAM 60 in support of the function is shown. The CRC stage 96a is entered only when the previous ME has indicated (via the next neighbor line 21a (FIG. 2)) that is has exited the stage. This ensures that the ME will access the most recent critical data (CRC residue). It is also critical that, throughout this pipe-stage, all threads execute in strict order to ensure that the CRC is calculated correctly. Because the CRC stage 96a uses the CAM 60, it firsts clears 202 the CAM of any data still in the CAM from a previous pipe-stage. It reads 204 the port type and determines 206 if it has been assigned an ATM cell. If the cell is not an ATM cell (that is, it is some other type, such as Ethernet or POS), the ME performing the CRC stage passes 208 the cell through without any processing. If the cell is an ATM cell, the ME 20 performs the CRC processing.

The processing includes the following activities: reading the CRC residue, ATM type and SOP/EOP state in SRAM; determining if the cell is carrying an SOP, body or EOP; validating that the VC is carrying AAL5 cells and, if so, performing the. CRC computation; and updating CRC residue and EOP-SOP status in SRAM.

The CRC computation is performed using the CRC unit 72 (FIG. 2) in the ME 20. The CRC computation must be performed in strict order to ensure that the CRC for cells that belong to the same VC are computed with the correct CRC residue.

The CRC processing is divided into a read phase and a modify/write phase. The CAM 60 is used in both phases. In the first phase, the CAM 60 is used to decide whether a thread should read the residue/type fields from SRAM 38 or use the result from a previous thread stored in the Local Memory 66 (FIG. 2). The first phase begins with a given thread searching the CAM 210 using the pointer to the re-assembly state. If the thread detects 212 a CAM miss, the thread writes 214 a CAM entry with the re-assembly pointer and state information to lock the entry, and issues a read to obtain the CRC residue and AAL type from SRAM memory 38. If, at 212, the thread detects a hit, it does not issue a read.

When the thread receives 216 the appropriate event signaling, that is, an event signal indicating that the previous thread has completed processing, the thread wakes and begins phase 2 processing. It searches 218 the CAM using the same re-assembly pointer. If the thread had issued a read and determines 220 a locked status for a matched CAM entry, the thread moves 222 the read result in the transfer registers to the local memory. The thread that moves the result also unlocks the entry, thereby ensuring a hit for future CAM lookups for that particular pointer. Otherwise, if the CAM entry is not locked, then a hit has occurred, and the thread simply reads 224 the corresponding information, that is, the residue and type, from the Local Memory.

After the second phase CAM search, each thread validates that the VC is carrying AAL5 by examining the type field from the VC table. For an AAL5 type, the thread computes 226 the CRC over the cell. If the type is not AAL5, the cell is handed off to an exception handler, or discarded, depending on the implementation.

If the thread determines 228 that the PTI bits in the ATM header indicate that the cell is an EOP cell, the thread updates 230 the re-assembly state by setting the CRC residue to all zeroes and setting the SOP bit to a one. If the cell is not an EOP cell, the thread updates 232 the state with the new residue and sets SOP to zero. It saves 235 the updated CRC residue and SOP in the Local Memory for use by other threads and, according to its writeback cache policy, also writes the CRC residue and SOP back to the re-assembly state in the SRAM 38. The thread passes 236 the SOP, EOP and body status to the next (packet processing) stage.

It is important that other stages in the RX pipeline know if the ATM cell contains an EOP, SOP or body. For ATM, the settings of the SOP and EOP bit indicate whether an entire cell was received (as opposed to an entire packet), so the CRC threads must use the EOP bit status provided in the header PTI field. The PTI bits only support EOP, so when an EOP is detected, the CRC thread sets an SOP bit in its section of the re-assembly state table indicating to the next thread that it has an SOP. Each time the CRC thread reads the re-assembly state, it reads the SOP bit, and if it is set, and the PTI bits in the ATM header indicate no EOP, it clears the SOP bit.

Because other stages do not read the CRC threads re-assembly state area, the CRC thread also passes the EOP/SOP status down the pipeline. Once the CRC threads have completed the CRC calculation and the re-assembly state table is updated, the threads are ready to move onto the next pipe-stage.

When a thread completes its CRC calculation and issues its SRAM write of the residue/type, it also signals the thread of the next ME indicating that it can start its CRC pipe-stage. It is important that the signaling ensures that the next ME is not provided a signal until it can be assured that any pending residues will be written before the next ME issues its residue reads.

It will be understood that, while the implementation described thus far uses the CAM 60 to reduce the number of read accesses (via "folding", as discussed earlier), the strict sequential ordering of the execution of context threads in a given stage is maintained not through the use of CAM, but instead by using local inter-thread signaling and by ensuring that read reference and modification activity completes before that same data in needed by successive threads.

It will be appreciated, however, that the CAM 60 could be used to maintain coherency and correct packet processing sequence as well. For example, say threads are handling two successive packets that are in the same flow (or are associated with the same queue number) and access the same SRAM location. Because packet arrival rates are faster than SRAM access speeds, the thread handling the second packet will be ready to access the data before the SRAM read and modify activities of the thread handling the first (earlier) packet have completed. In this situation, the software-controlled CAM cache implementation can be used to recognize the dependency and to ensure that the most current information is always used. Thus, each thread uses the CAM 60 to do multiple compares in parallel using the CAM Lookup instruction, with a source register providing the flow number or queue number as the lookup value, as described earlier.

If a miss results, the thread commences the SRAM read and allocates a CAM entry in into which the thread places the flow number. If the flow is already in the CAM, a hit indicator is returned along with a unique pointer value (for example, which entry number in the CAM matched). The thread that gets a hit in the CAM can obtain the latest copy of the data from local memory (cache in SRAM controller 40, or ME Local Memory 66) without having to do an SRAM read.

When a thread loads a flow number into a CAM entry, it also stores state information in the entry to enable subsequent thread lookups to determine that either a) the SRAM read has been started, but is not yet completed (it is "in-flight"); or b) the SRAM read has been completed, and the data is valid. If the "in-flight" status is determined, the subsequent thread knows that it should not start a read, but that it cannot yet use the read data. It can continue to test the status of the entry until it determines that the status has been changed to reflect valid data.

Other embodiments are within the scope of the following claims.

What is claimed is:

1. A method for use in a processor having multiple multi-threaded programmable engines integrated within the processor:
  at a first thread of a one of the multiple multi-threaded engines:
  performing a first thread lookup of a tag in a content addressable memory (CAM) within the one of the multiple multi-threaded engines;
  if the first thread lookup results in a lookup miss of the tag in the CAM:
  initiating a read of data associated with the tag from memory external to the one of the multiple multi-threaded engines into locations in storage internal to the one of the multiple multi-threaded engines:
  writing an entry for the tag into the CAM; and
  if the first thread lookup results in a lookup hit of the tag in the CAM:
  modifying data at at least one of the locations in the storage internal to the one of the multiple multi-threaded engines without initiating a read of data associated with the tag from memory external to the one of the multiple multi-threaded engines;
  at a second thread of the one of the multiple multi-threaded engines:
  performing a second thread lookup of the tag in a content addressable memory (CAM) within the one of the multiple multi-threaded engines;
  if the second thread lookup results in a lookup miss of the tag in the CAM:
  initiating a read of data associated with the tag from memory external to the one of the multiple multi-threaded engines into locations in storage internal to the one of the multiple multi-threaded engines;
  writing an entry for the tag into the CAM; and
  if the second thread lookup results in a lookup hit of the tag in the CAM:
  modifying data at at least one of the locations in the storage internal to the one of the multiple multi-threaded engines without initiating a read of data associated with the tag from memory external to the one of the multiple multi-threaded engines.

2. The method of claim 1, further comprising:
writing data at the locations in the storage internal to the one of the multiple multi-threaded engines to the memory external to the one of the multiple multi-threaded engines.

3. The method of claim 1, further comprising determining the locations in the storage for data associated with the tag.

4. The method of claim 3, wherein the determining comprises determining based on an index number of the entry within the CAM.

5. The method of claim 1, further comprising:
at the first thread, locking the entry; and
at the second thread, awaiting unlocking oft the entry before modifying the data.

6. The method of claim 5, wherein the locking comprises writing state data associated with the entry into the CAM.

7. The method of claim 1,
wherein the first thread comprises a thread to process a first packet received from a network; and
wherein the second thread comprises a thread to process a second packet received from the network.

8. Apparatus including a processor, comprising:
multiple programmable engines integrated within the processor, each of the engines comprising:
registers; and
multiple execution units operationally coupled to the registers to receive input and write output to the registers, the multiple execution units performing operations on operands provided by the registers in response to instructions, the execution units including an arithmetic logic unit (ALU) and a content addressable memory (CAM), at least one of the instructions including at least one opcode bit selecting the CAM among the execution units.

9. The apparatus of claim 8, wherein the multiple programmable engines comprise multiple multi-threaded programmable engines, wherein each of the engines includes multiple program counters for each respective thread provided by the engines.

10. The apparatus of claim 9, wherein the ALU and the CAM are configured in parallel with respect to the registers.

11. The apparatus of claim 9, wherein:
if a CAM entry matches a tag being looked up, the CAM is configured to output a hit signal; and
if no CAM entry matches a tag being lookup up, the CAM is configured to output a miss signal and a number of the least recently used CAM entry.

12. The apparatus of claim 9, wherein the registers comprise a register file.

13. The apparatus of claim 9, wherein the registers comprise registers that buffer data transferred to memory external to an engine and registers that buffer data being transferred directly between engines.

14. The apparatus of claim 9, wherein the instructions comprise a CAM lookup instruction and a CAM write instruction.

15. A system, comprising:
at least one Ethernet media access controller,
at least one processor coupled to the at least one Ethernet media access controller, the processor comprising:
multiple multi-threaded programmable engines integrated within the processor, multiple ones of the engines comprising:
registers;
multiple execution units operationally coupled to the registers to receive input and write output to the registers, the multiple execution units performing operations on operands provided by the registers in response to instructions, the execution units including an arithmetic logic unit (ALU) and a content addressable memory (CAM), at least one of the instructions including at least one bit selecting the CAM among the execution units.

16. The system of claim 15,
wherein the ALU and the CAM are configured in parallel with respect to the registers;
where in:
if a CAM entry matches a tag being looked up, the CAM is configured to output a hit signal; and
if a CAM entry does riot match a tag being lookup up, the CAM is configured to output a miss signal and output a number of the least recently used CAM entry; and
wherein the instructions comprise a CAM lookup instruction and a CAM write instruction.

17. A computer program product residing on a computer-readable medium comprising instructions to cause a computer, including a processor having multiple multi-threaded programmable engines integrated within the processor, to perform operations comprising:
at a first thread of a one of the multiple multi-threaded engines:
performing a first thread lookup of a tag in a content addressable memory (CAM) within the one of the multiple multi-threaded engines;
if the first thread lookup results in a lookup miss of the tag in the CAM:
initiating a read of data associated with the tag from memory external to the one of the multiple multi-threaded engines into locations in storage internal to the one of the multiple multi-threaded engines;
writing an entry for the tag into the CAM; and
if the first thread lookup results in a lookup hit of the tag in the CAM:
modifying data at at least one of the locations in the storage internal to the one or the multiple multi-threaded engines without initiating a read of data associated with the tag from memory external to the one of the multiple multi-threaded engines;
at a second thread of the one of the multiple multi-threaded engines:
performing a second thread lookup of the tag in a content addressable memory (CAM) within the one of the multiple multi-threaded engines;
if the second thread lookup results in a lookup miss of the tag in the CAM:
initiating a read of data associated with the tag from memory external to the one of the multiple multi-threaded engines into locations in Storage internal to the one of the multiple multi-threaded engines;
writing an entry for the tag into the CAM; and
if the second thread lookup results in a lookup hit of the tag in the CAM:
modifying data at at least one of the locations in the storage internal to the one of the multiple multi-threaded engines without initiating at read of data associated with the tag from memory external to the one of the multiple multi-threaded engines.

18. The computer program product of claim 17,
wherein the first thread comprises a thread to process a first packet received from a network; and
wherein the second thread comprises a thread to process a second packet received from the network.

* * * * *

UNITED STATES PATENT AND TRADEMARK OFFICE
CERTIFICATE OF CORRECTION

| | |
|---|---|
| PATENT NO. | : 7,246,197 B2 |
| APPLICATION NO. | : 11/043782 |
| DATED | : July 17, 2007 |
| INVENTOR(S) | : Mark B. Rosenbluth, Gilbert Wolrich and Debra Bernstein |

It is certified that error appears in the above-identified patent and that said Letters Patent is hereby corrected as shown below:

Title page Item (63) and Item (60) insert:

--     Related U.S. Application Data

(63)    Continuation of application No. 10/212,943, filed on Aug. 5, 2002.

(60)    Provisional application No. 60/315,144, filed on Aug. 27, 2001. --

Signed and Sealed this

Seventeenth Day of February, 2009

JOHN DOLL
*Acting Director of the United States Patent and Trademark Office*